US012625924B2

(12) United States Patent
Kim et al.

(10) Patent No.: US 12,625,924 B2
(45) Date of Patent: May 12, 2026

(54) METHOD AND APPARATUS FOR DATA AUGMENTATION

(71) Applicants: SAMSUNG SDS CO., LTD., Seoul (KR); INDUSTRY-ACADEMIC COOPERATION FOUNDATION, YONSEI UNIVERSITY, Seoul (KR)

(72) Inventors: Min Jung Kim, Seoul (KR); Young Seon Lee, Seoul (KR); No Seong Park, Seoul (KR); Ji Hyeon Hyeong, Seoul (KR); Ja Young Kim, Seoul (KR)

(73) Assignees: SAMSUNG SDS CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 712 days.

(21) Appl. No.: 17/967,068

(22) Filed: Oct. 17, 2022

(65) Prior Publication Data

US 2023/0118164 A1     Apr. 20, 2023

(30) Foreign Application Priority Data

Oct. 18, 2021     (KR) ........................ 10-2021-0138538

(51) Int. Cl.
    *G06F 18/21*          (2023.01)
    *G06F 18/214*          (2023.01)
                (Continued)

(52) U.S. Cl.
    CPC .......... *G06F 18/217* (2023.01); *G06F 18/214* (2023.01); *G06F 18/22* (2023.01); *G06F 18/2431* (2023.01); *G06N 20/00* (2019.01)

(58) Field of Classification Search
    CPC ...... G06F 18/217; G06F 18/22; G06F 18/214; G06F 18/2431
    See application file for complete search history.

(56) References Cited

U.S. PATENT DOCUMENTS 9,672,364 B2     6/2017   Zhang et al.
2020/0272944 A1*  8/2020   Goodsitt ............... G06F 18/214
            (Continued)

OTHER PUBLICATIONS

Mariani, Giovanni, et al. "BAGAN: Data Augmentation with Balancing GAN." Arxiv. Org., arXiv:1803.09655v2, Jun. 5, 2018, pp. 1-9.

(Continued)

*Primary Examiner* — Khanh B Pham
(74) *Attorney, Agent, or Firm* — NSIP Law

(57)          ABSTRACT

An apparatus for data augmentation includes a mode separating unit generating minor class fake data from a latent vector, an embedding vector generating unit generating embedding vectors for major class original data, minor class original data, and the minor class fake data through a metric network, an auxiliary classifying unit classifying a class of the embedding vectors from the embedding vector generating unit, and feedbacking the classified result in the mode separating unit, and a classifying unit determining whether the input data is authentic by receiving the embedding vector of the minor class original data and the embedding vector of the minor class fake data from the embedding vector generating unit, and feedbacking the determined result in the mode separating unit.

19 Claims, 5 Drawing Sheets

(51) Int. Cl.
  *G06F 18/22* (2023.01)
  *G06F 18/2431* (2023.01)
  *G06N 20/00* (2019.01)

(56) References Cited

U.S. PATENT DOCUMENTS

| 2021/0073671 | A1* | 3/2021 | Puri | G06N 5/04 |
| 2021/0241118 | A1* | 8/2021 | Zarkov | G06Q 20/4016 |
| 2021/0249142 | A1* | 8/2021 | Lau | G16H 50/50 |
| 2021/0310075 | A1* | 10/2021 | Maher | G16H 40/20 |
| 2022/0156634 | A1* | 5/2022 | Margolin | G06N 20/00 |
| 2023/0094954 | A1* | 3/2023 | Sinha | G06V 10/776 |
| | | | | 382/103 |

OTHER PUBLICATIONS

Mullick, Sankha Subhra, et al. "Generative Adversarial Minority Oversampling." Proceedings of the IEEE/CVF international conference on computer vision. 2019, pp. 1695-1704.

Dam, Tanmoy, et al. "Does Adversarial Oversampling Help us?" Arxiv. Org., arXiv:2108.10697v1, Aug. 2021, (4 pages in English).

Extended European search report issued on Mar. 7, 2023, in counterpart European Patent Application No. 22201574.5 (8 pages in English).

* cited by examiner

FIG.3

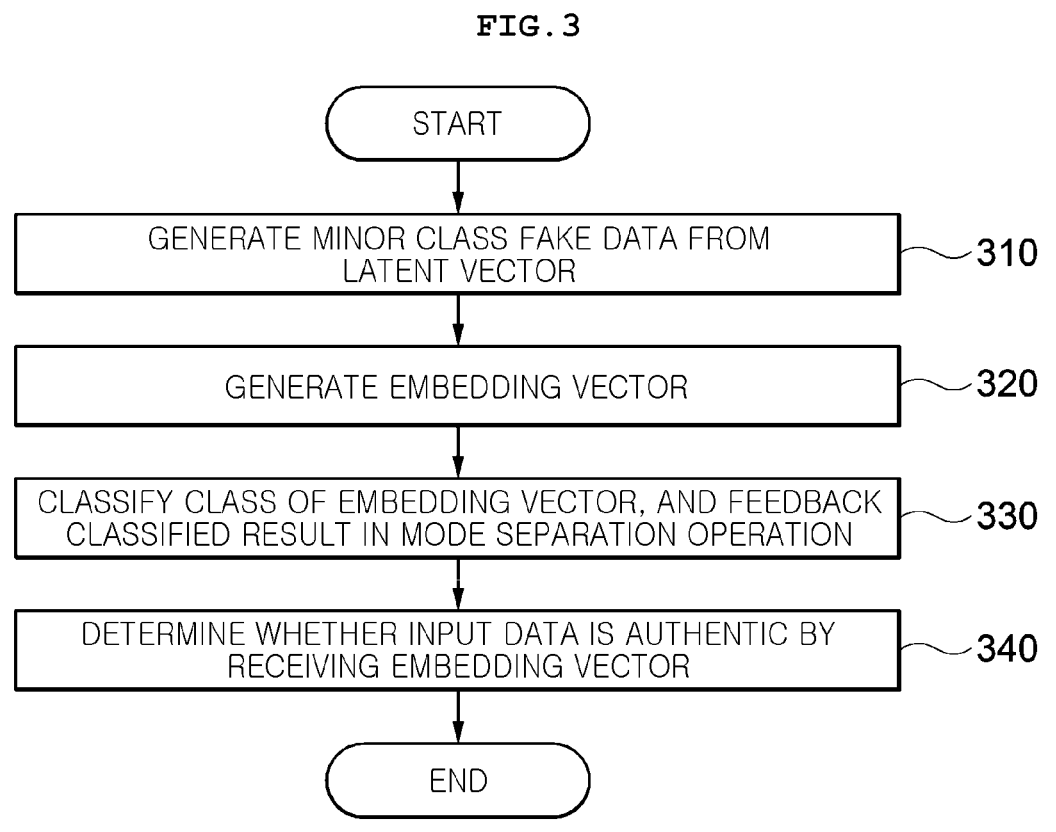

```
                    ┌──────────────┐
                    │    START     │
                    └──────┬───────┘
                           │
                           ▼
┌─────────────────────────────────────────────────┐
│   GENERATE MINOR CLASS FAKE DATA FROM            │ ~310
│              LATENT VECTOR                        │
└─────────────────────────┬─────────────────────────┘
                           │
                           ▼
┌─────────────────────────────────────────────────┐
│         GENERATE EMBEDDING VECTOR                 │ ~320
└─────────────────────────┬─────────────────────────┘
                           │
                           ▼
┌─────────────────────────────────────────────────┐
│ CLASSIFY CLASS OF EMBEDDING VECTOR, AND FEEDBACK  │ ~330
│ CLASSIFIED RESULT IN MODE SEPARATION OPERATION    │
└─────────────────────────┬─────────────────────────┘
                           │
                           ▼
┌─────────────────────────────────────────────────┐
│  DETERMINE WHETHER INPUT DATA IS AUTHENTIC BY     │ ~340
│        RECEIVING EMBEDDING VECTOR                 │
└─────────────────────────┬─────────────────────────┘
                           │
                           ▼
                    ┌──────────────┐
                    │     END      │
                    └──────────────┘
```

Figure 5:
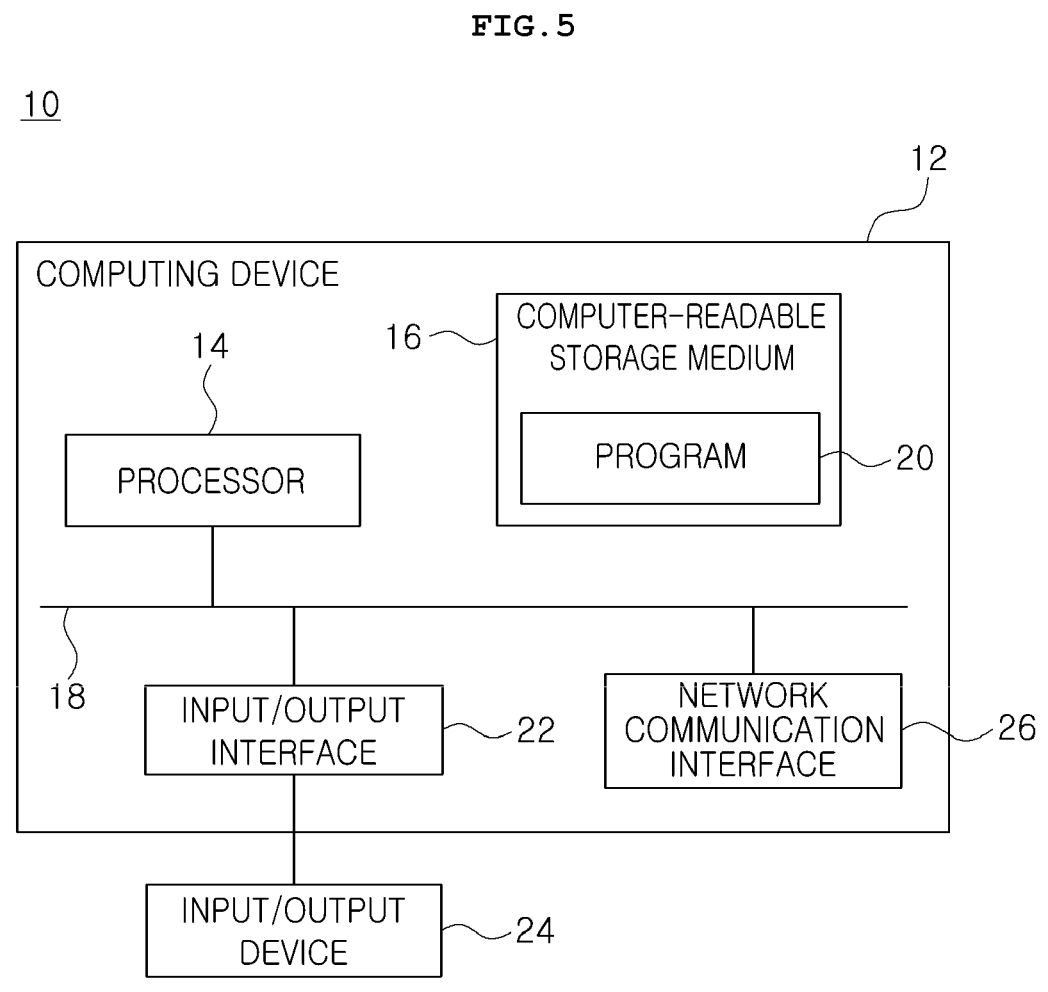

COMPUTING DEVICE

14

16 — COMPUTER-READABLE STORAGE MEDIUM

PROCESSOR

PROGRAM — 20

18

INPUT/OUTPUT INTERFACE — 22

NETWORK COMMUNICATION INTERFACE — 26

INPUT/OUTPUT DEVICE — 24

METHOD AND APPARATUS FOR DATA AUGMENTATION

CROSS-REFERENCE TO RELATED APPLICATION AND CLAIM OF PRIORITY

This application claims the benefit under 35 USC § 119 of Korean Patent Application No. 10-2021-0138538, filed on Oct. 18, 2021 in the Korean Intellectual Property Office, the entire disclosure of which is incorporated herein by reference for all purposes.

BACKGROUND

1. Field

Disclosed embodiments relate to techniques for data augmentation.

2. Description of Related Art

Class imbalance indicates a phenomenon in which the amount of data belonging to one class is insufficient, compared to other classes in a classification problem. Class imbalance causes a problem in generating a classifying unit for classifying classes using machine learning models and deep learning-based models. In order to solve this problem, various oversampling techniques for augmenting minor class data have been proposed.

One of the most well-known and widely used oversampling techniques is a synthetic minority over-sampling technique (SMOTE), and various modifications have been proposed, starting with this technique, proposed in 2002. However, while SMOTE is effective in augmenting minor classes in a data set composed of only continuous variables, there is a limitation in a mixed data set in which continuous variables and nominal variables are mixed.

SUMMARY

Disclosed embodiments are to provide a method and apparatus for data augmentation.

According to an aspect of the present disclosure, an apparatus for data augmentation may include: one or more processors; and a memory storing one or more programs which are configured to be executed by the one or more processors and include instructions for a mode separating unit, an embedding vector generating unit, an auxiliary classifying unit and a classifying unit. The mode separating unit is configured to generate minor class fake data from a latent vector; the embedding vector generating unit is configured to generate an embedding vector for each of major class original data, minor class original data, and minor class fake data, through a metric network; the auxiliary classifying unit is configured to classify a class of an embedding vector by receiving the embedding vector of the major class original data, the embedding vector of the minor class original data, and the embedding vector of the minor class fake data, and feedbacking the classified result in the mode separating unit; and the classifying unit is configured to determine whether the input data is authentic by receiving the embedding vector of the minor class original data and the embedding vector of minor class fake data from the embedding vector generating unit, and feedbacking the determined result in the mode separating unit.

The mode separating unit may include: a plurality of generating units generating different fake data from a latent vector using a generative adversarial network; and a gating network selecting one of the plurality of fake data generated by each of the plurality of generating units as minor class fake data.

Among the plurality of generating units, a generating unit generating fake data selected by the gating network may be trained so that the fake data is different from the major class original data based on a feedback of the minor class fake data corresponding to the selected fake data received from the auxiliary classifying unit.

Among the plurality of generating units, a generating unit generating fake data selected by the gating network may be trained so that the fake data is similar to the minor class original data based on a feedback of the minor class fake data corresponding to the selected fake data received from the classifying unit.

The gating network may be trained to select fake data, similar to the minor class original data, based on the feedback received from the auxiliary classifying unit.

The plurality of generating units may generate fake data corresponding to one or more sub-classes of a minor class from a latent vector.

The embedding vector may be generated so that data included in the same category are close to each other and data included in different categories are distant from each other through metric learning.

When the embedding vector of the minor class fake data is classified into the embedding vector of the major class original data or the embedding vector of the minor class fake data, the auxiliary classifying unit may transmit negative feedback to the mode separating unit.

When the embedding vector of the minor class fake data is determined to be fake, the classifying unit may transmit negative feedback to the mode separating unit.

According to an aspect of the present disclosure, a method for data augmentation, performed on a computing device including one or more processors and a memory storing one or more programs executed by the one or more processors, may include: a mode separation operation generating minor class fake data from a latent vector; an embedding vector generating operation generating an embedding vector for each of major class original data, minor class original data, and minor class fake data through a metric network; an auxiliary classification operation classifying a class of an embedding vector by receiving the embedding vector of the major class original data, the embedding vector of the minor class original data, and the embedding vector of the minor class fake data, and feedbacking the classified result in the mode separation operation; and a classification operation determining whether the input data is authentic by receiving the embedding vector of the minor class original data and the embedding vector of the minor class fake data, and feedbacking the determined result in the mode separation operation.

In the mode separation operation, different fake data may be generated from a latent vector using a plurality of generative adversarial networks, and one of the plurality of fake data generated by the plurality of generative adversarial networks may be selected as minor class fake data.

The generative adversarial neural network generating the selected fake data may be trained so that the fake data is different from the major class original data based on the feedback of the minor class fake data corresponding to the selected fake data received from the auxiliary classification operation.

The generative adversarial neural network generating the selected fake data may be trained so that the fake data is similar to the minor class original data based on the feedback of the minor class fake data corresponding to the selected fake data received from the classification operation.

In the mode separation operation, a gating network may be trained to select fake data, similar to the minor class original data based on the feedback received from the auxiliary classification operation.

The plurality of generative adversarial neural networks may generate fake data corresponding to one or more sub-classes of a minor class from a latent vector.

The embedding vector may be generated so that data included in the same category are close to each other and data included in different categories are distant from each other through metric learning In the auxiliary classification operation, when the embedding vector of the minor class fake data is classified into the embedding vector of the major class original data or the embedding vector of the minor class fake data, negative feedback may be transmitted in the mode separation operation.

In the classification operation, when the embedding vector of the minor class fake data is determined to be fake, negative feedback may be transmitted in the mode separation operation.

BRIEF DESCRIPTION OF THE DRAWINGS

The above and other aspects, features, and advantages of the present disclosure will be more clearly understood from the following detailed description, taken in conjunction with the accompanying lead-outs, in which:

FIG. 3 is a flowchart of method for data augmentation according to an embodiment.

FIG. 5 is a block diagram illustrating and explaining a computing environment including a computing device according to an embodiment.

DETAILED DESCRIPTION

Figure 1:
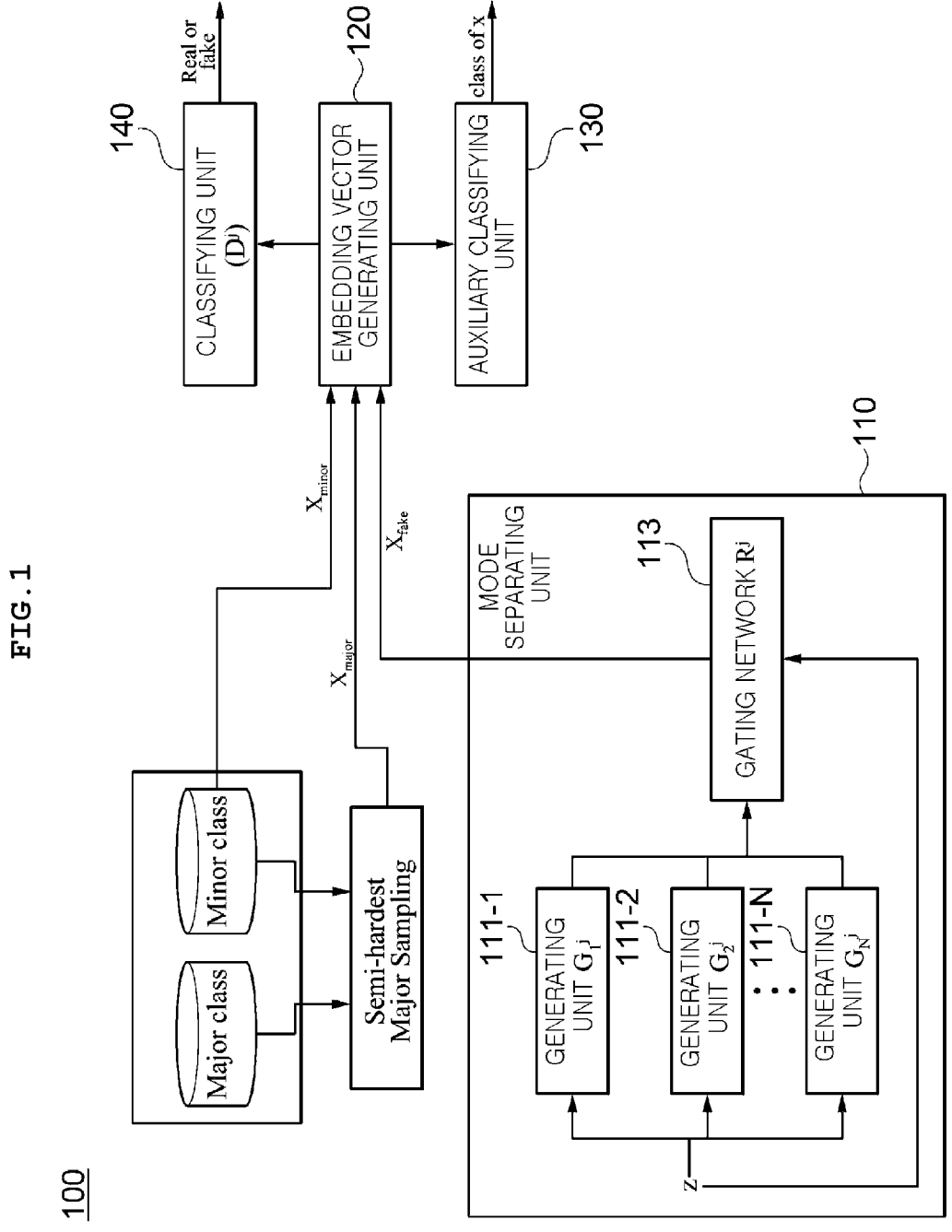
FIG. 1 is a block diagram of an apparatus for data augmentation according to an embodiment.

Hereinafter, embodiments in the present disclosure will be described with reference to the accompanying drawings. The disclosure may, however, be exemplified in many different forms and should not be construed as being limited to the specific embodiments set forth herein.

Rather, these embodiments are provided so that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity, and elements indicated by the same reference numerals in the drawings are the same elements.

FIG. 1 is a block diagram of an apparatus for data augmentation according to an embodiment.

According to an embodiment, an apparatus for data augmentation 100 may include a mode separating unit 110, an embedding vector generating unit 120, an auxiliary classifying unit 130, and a classifying unit 140.

According to an embodiment, the apparatus for data augmentation 100 may further include: a database for storing major class original data and minor class original data, and a semi-hardest major sampling unit for sampling major class original data, similar to the minor class original data, among the major class original data.

For example, the semi-hardest major sampling unit may select data, similar to the minor class original data, among data of the major class original data. In other words, the semi-hardest major sampling unit may select the major class original data, which is difficult to distinguish from the minor class original data. Thereby, the apparatus for data augmentation 100 may increase learning efficiency by using data on a boundary line between a major class and a minor class, rather than using arbitrary major class original data. To this end, the semi-hardest major sampling unit may be composed of an artificial neural network for sampling the major class original data, similar to the minor class original data.

According to an embodiment, the mode separating unit 110 may generate minor class fake data from a latent vector.

According to an embodiment, the mode separating unit 110 may include a plurality of generating units 111-1 to 111-N generating different fake data from a latent vector using a generative adversarial network and a gating network 113 selecting one of the plurality of fake data generated by each of the plurality of generating units 111-1 to 111-N as minor class fake data.

According to an embodiment, the plurality of generating units 111-1 to 111-N may generate fake data corresponding to one or more sub-classes of the minor class from the latent vectors.

As an example, the minor class data may be composed of sub-classes having different characteristics. For example, in the case of diabetes data, a normal case occupying most test subjects may be a major class, and a diabetic prevalence case, occupying a small number of cases, may be a minor class. In this case, the diabetic prevalence case may be further classified as a subclass into type 1 diabetes and type diabetes cases. However, in many data cases, the definition of a sub-class is ambiguous, or data that is not divided sub-classes may be given. In this case, it is necessary to have a neural network discover and process the sub-classes, which is known as mode separation.

According to an example, the mode separating unit 110 may include a plurality of generating units 111-1 to 111-N and a gating network 113, an additional neural network dedicated to mode separation. For example, the plurality of generating units 111-1 to 111-N may generate different data, and the gating network 113 may select one of the data generated by the plurality of generating units. In this case, the gating network 113 may be trained to select a material, which is difficult to distinguish from the minor class original data based on the feedback of the classifying unit 140 and the auxiliary classifying unit 130.

As an example, among the plurality of generating units 111-1 to 111-N, only a generating unit selected by the gating network 113 may be trained so that each of generating units generates different sub-data by being learned based on the feedback of the classifying unit 140 and the auxiliary classifying unit 130.

According to an embodiment, among the plurality of generating units 111-1 to 111-N, a generating unit, generating fake data selected by the gating network 113 may be trained so that the fake data is different from the major class original data based on the feedback on the minor class fake data corresponding to the selected fake data received from the auxiliary classifying unit.

For example, a plurality of generating units may be used as a structure for identifying a mixture factor on the assumption that data can be expressed as a mixture model. Accordingly, the plurality of generating units may allow the network to automatically learn multiple mode of data that may exist for each class, thereby generating fake data of the corresponding class from the distribution of original data.

Figure 2:
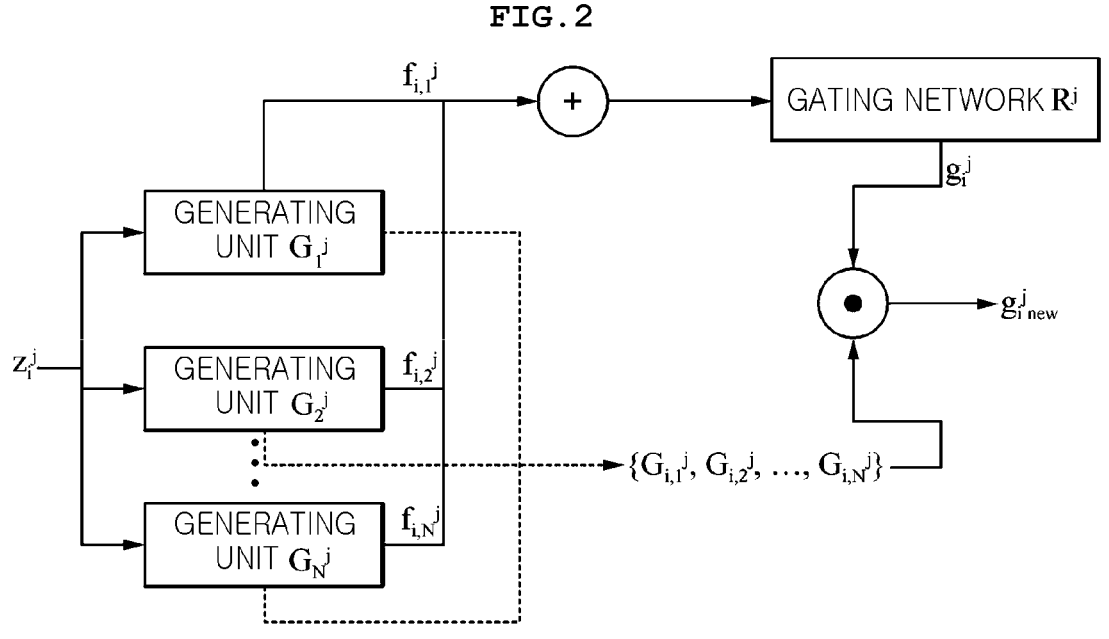
FIG. 2 is a configuration diagram of a mode analysis unit according to an embodiment.

Referring to FIG. 2, the plurality of generating units may generate minor class fake data from a latent vector. In FIG. 2, j is an index of the minor class, i is an index of individual fake data in the corresponding class, and N is the number of the plurality of generating units.

According to this example, a latent vector z follows a standard Gaussian distribution, and $z_i^j$ may pass through a plurality of N generating units $(G_1^j, G_2^j, \ldots, G_N^j)$ having a dependency only on the $j^{th}$ class to generate $\{G_{(i,1)}^j, \ldots, G_{(i,N)}^j\}$. In a process of the latent vector passing through the plurality of generating units, an intermediate calculated value $\{f_{(i,1)}^j, \ldots, f_{(i,N)}^j\}$ may be generated, and the intermediate calculated value may pass through the gating network to generate a one-hot vector $g_i^j$. For example, when N=5, $g_i^j$={0, 1, 0, 0, 0}, which means that the minor class fake data is generated by the second generating unit, $G_2^j$.

According to an example, the gating network may perform vector multiplication on the calculated value $g_i^j$ and the calculated values $\{G_{(i,1)}^j, G_{(i,N)}^j\}$ of the plurality of generating units to generate fake data $g_i^j$new of the class j.

According to an embodiment, the embedding vector generating unit 120 may generate an embedding vector for each of major class original data, minor class original data, and minor class fake data through a metric network.

According to an embodiment, the embedding vector may be generated so that data included in the same category are close to each other and data included in different categories are distant from each other through metric learning. As an example, the embedding vector generating unit 120 may perform metric learning for learning a metric function that quantifies a degree of similarity among major class original data, minor class original data, and minor class fake data. Therethrough, the embedding vector generating unit 120 may generate the embedding vector of data belonging to the same category to be close to each other, and may generate the embedding vector of data belonging to different categories to be distant from each other.

According to an embodiment, the auxiliary classifying unit 130 may classify a class of an embedding vector by receiving the embedding vector of the major class original data, the embedding vector of the minor class original data, and the embedding vector of the minor class fake data from the embedding vector generating unit 120, and feedbacking the classified result in the mode separating unit 110.

According to an embodiment, the auxiliary classifying unit 130 may transmit negative feedback to the mode separating unit 110 when the embedding vector of the minor class fake data is classified into the embedding vector of the major class original data or the embedding vector of the minor class fake data.

According to an example, when the auxiliary classifying unit 130 generates minor class fake data, similar to the major class original data, negative feedback is given to cause the plurality of generating units 111-1 to 111-1N to generate data having the intrinsic characteristics of the minor class original data.

According to an example, the auxiliary classifying unit 130 may perform an operation of distinguishing the major class original data, the minor class original data, and the minor class fake data generated by the mode separating unit 110, and feedbacking the result thereof in the mode separating unit 110 to improve the performance of the mode separating unit 110. Specifically, the auxiliary classifying unit 130 transmits negative feedback to the mode separating unit 110, when the minor class fake data generated by the mode separating unit 110 are determined to be major class original data or minor class fake data. The mode separating unit 110 may be trained to generate minor class fake data, differently from the major class original data by receiving the negative feedback transmitted by determining the minor class fake data as the major class original data by the auxiliary classifying unit 130. In addition, the mode separating unit 110 may be trained to generate minor class fake data, similarly to the minor class original data by receiving the negative feedback transmitted by determining the minor class fake data as the minor class fake data by the auxiliary classifying unit 130.

According to an example, the auxiliary classifying unit 130 may classify labels such as 'major class original,' 'minor class original,' and 'minor class fake.' For example, when there are one major class and two minor classes, the auxiliary classifying unit 130 must classify a total of five labels. Therethrough, when the auxiliary classifying unit 130 generates fake data in a specific minor class, a feedback is given to the mode separating unit 110 not to generate data, similar to other minor classes or major classes. That is, the auxiliary classifying unit 130 may serve to determine 'what should not be generated.'

According to an embodiment, the classifying unit. 140 may receive an embedding vector of the minor class original data and an embedding vector of the minor class fake data from the embedding vector generating unit 120 and determine whether the input data is authentic, and feedback the determined result to the mode separating unit 110.

According to an embodiment, the classifying unit 140 may transmit negative feedback to the mode separating unit 10 when the embedding vector of the minor class fake data is determined to be fake.

As an example, a general generative adversarial network (GAN) is composed of two artificial neural networks: a generating unit and a discriminator. In this case, the generating unit is trained to generate fake data that is similar to the authentic data so as to be indistinguishable from the authentic data, and the discriminator is trained to distinguish between authentic data and fake data. For example, each time the discriminator detects that the data generated by the generating unit is fake through adversarial learning, the generating unit receives negative feedback from the discriminator to improve the quality of the fake data.

According to an embodiment, among the plurality of generating units 111-1 to 111-N, a generating unit, generating the fake data selected by the gating network may be trained so that fake data is similar to the minor class original data based on the feedback of the minor class fake data corresponding to the selected fake data received from the classifying unit 140.

According to an example, the mode separating unit 110 may input an output obtained by inputting the latent vector z to the plurality of generating units 111-1 to 111-N in the adversarial learning process to the gating network 113 to generate minor class fake data. The classifying unit 140 may receive the minor class original data and the minor class fake data generated by the mode separating unit 110 and determines whether the input data is fake or authentic. For example, when the classifying unit 140 determines that the minor class fake data generated by the mode separating unit 110 is fake, the classifying unit 140 may transmit negative feedback to the mode separating unit 110. Therethrough, the mode separating unit 110 may be trained to make the minor class fake data more similar to the minor class authentic data.

According to an embodiment, the gating network 113 may be trained to select fake data, similar to the minor class original data based on the feedback received from the auxiliary classifying unit 130.

According to an example, the gating network 113 may select one of data generated by a plurality of generating units. In this case, the gating network 113 may be trained to select a material which is difficult to distinguish from the minor class original data based on the feedback of the classifying unit 140 and the auxiliary classifying unit 130.

According to an example, the apparatus for data augmentation 100 must learn five structures corresponding to the plurality of generating units G, the gating network R, the embedding vector generating unit M, the auxiliary classifying unit C, and the classifying unit D. A loss function for this may be expressed as follows.

$$L_{metric}(M)+\alpha L_{GAN}(G,R,D)+L_{aux}(G,R,C)+\beta L_{LB}(R) \qquad \text{[Equation 1]}$$

Where, an N-pair loss is used for $L_{metric}(M)$, a general GAN loss is used for $L_{GAN}(G,R,D)$, and a cross-entropy loss is used for $L_{aux}(G,R,C)$. $L_{LB}(R)$ is a regularization term for preventing the gating network from being concentrated on several generating units during training, which is known as load-balancing loss. Load-balancing loss is defined as follows.

$$L_{LB}(R) \equiv \sum_i \left\| \frac{\sum_{k=1}^{b} g_k^j}{b} - U\{1, 2, \dots, N\} \right\|_2^2 \qquad \text{[Equation 2]}$$

where, $U\{1, 2, \dots, N\}$ represents a uniform distribution for the number of a plurality of generating units, and serves to make an actual distribution of an output value $g_k^j$ of the gating network obtained for a mini-hatch size b evenly spread across the N generating units, where $g_k^j$ denotes an output of the gating network the $k^{th}$ (k=1, . . . , b) sample.

FIG. 3 is a flowchart of a method for data augmentation according to an embodiment.

According to an embodiment, a method for data augmentation may include a mode separation operation generating minor class fake data from a latent vector (operation 310).

According to an embodiment, the apparatus for data augmentation 100 may include: a plurality of generating units generating different fake data from a latent vector using a generative adversarial network to perform a mode separation operation, and a gating network selecting one of a plurality of fake data generated by each of the plurality of generating units as minor class fake data.

According to an embodiment, the plurality of generative adversarial neural networks may generate fake data corresponding to one or more sub-classes of the minor class from the latent vector.

According to an example, the mode separation operation may be performed using a plurality of generating units and a gating network, an additional neural network dedicated to mode separation. For example, the plurality of generating units may generate different data, and the gating network may select one of the data generated by the plurality of generating units. In this case, the gating network may be trained to select materials that are difficult to distinguish from the minor class original data based on the feedback of the classification operation and the auxiliary classification operation.

For example, only a generating unit selected by the gating network from among the plurality of generating units may be trained based on the feedback of the classification operation and the auxiliary classification operation, to be trained so that each of the generating units generates different sub-data.

According to an embodiment, the generative adversarial neural network, which generates selected fake data, may be trained so that fake data is different from the major class original data based on the feedback on the minor class fake data corresponding to the selected fake data received from the auxiliary classification operation.

For example, a plurality of generating units may be used as a structure for identifying a mixture factor on the assumption that data can be expressed as a mixture model. Accordingly, the plurality of generating units may allow the network to automatically learn multiple modes of data that may exist for each class, thereby generating fake data of the corresponding class from the distribution of original data.

According to an embodiment, the method for data augmentation may include an embedding vector generating operation generating an embedding vector for each of major class original data, minor class original data, and minor class fake data through a metric network (operation 320).

According to an embodiment, the embedding vector may be generated so that data included in the same category are close to each other and data included in different categories are distant from each other through metric learning. As an example, the embedding vector generating operation may perform metric learning for learning a metric function that quantifies a degree of similarity between data for major class original data, minor class original data, and minor class fake data. Therethrough, in the embedding vector generating operation, the embedding vector of data belonging to the same category may be generated to be close to each other, and the embedding vector of data belonging to different categories may be generated to be distant from each other.

According to an embodiment, the method for data augmentation may include an auxiliary classification operation classifying a class of an embedding vector by receiving the embedding vector of the major class original data, the embedding vector of the minor class original data, and the embedding vector of the minor class fake data, and feedbacking of the classified result in the mode separation operation (operation 330).

According to an embodiment, in the auxiliary classification operation, when the embedding vector of the minor class fake data is classified into an embedding vector of the major class original data or an embedding vector of the minor class fake data, a negative feedback may be transmitted in the mode separation operation.

According to an embodiment, in the auxiliary classification operation, when the plurality of generating units performing the mode separation operation generate minor class fake data, similar to the major class original data, negative feedback may be given to cause the plurality of generating units to generate data having intrinsic characteristics of the minor class original data.

According to an example, the auxiliary classification operation may perform an operation of classifying the major class original data, the minor class original data, and the minor class fake data generated in the mode separation operation, and feeds the result thereof back in the mode separation operation to improve the performance of the mode separation operation. Specifically, in the auxiliary classification operation, when the minor class fake data generated in the mode separation operation is determined to be major class original data or minor class fake data, negative feedback may be transmitted in the mode separation operation. In the mode separation operation, it may be trained to generate minor class fake data, differently from the major class original data by receiving the negative feedback transmitted by determining the minor class fake data as the major class original data in the auxiliary classification operation. In addition, in the mode separation operation, it may be trained to generate minor class fake data, similarly to the minor class original data by receiving the negative feedback transmitted by determining the minor class fake data as minor class fake data in the auxillary classification operation.

According to an example, in the auxiliary classification operation, labels such as 'major class original,' 'minor class original,' and 'minor class fake' may be classified. For example, if there are one major class and two minor classes, the auxiliary classification operation should classify a total of five labels. Therethrough, in the auxiliary classification operation, when fake data are generated in a specific minor class, a feedback is given not to generate data, similar to other minor classes or major classes in the mode separation operation.

According to an embodiment, the method for data augmentation may include a classification operation of determining whether the input data is authentic by receiving the embedding vector of the minor class original data and the embedding vector of the minor class fake data, and feedbacking the determined result in the mode separation operation (operation 340).

According to an embodiment, in the classification operation, when the embedding vector of the minor class fake data is determined to be fake, negative feedback may be transmitted in the mode separation operation.

According to an embodiment, the generative adversarial neural network generating the selected fake data may be trained so that fake data is similar to the minor class original data based on the feedback of the minor class fake data corresponding to the selected fake data received from the classification operation.

According to an example, the gating network may be trained to select fake data, similar to the minor class original data based on the feedback received from the auxiliary classification operation.

According to an example, the gating network may select one of the data generated by the plurality of generating units. In this case, the gating network may be trained to select a material that is difficult to distinguish from the minor class original data based on the feedback in the classification operation and the auxiliary classification operation.

Figure 4:
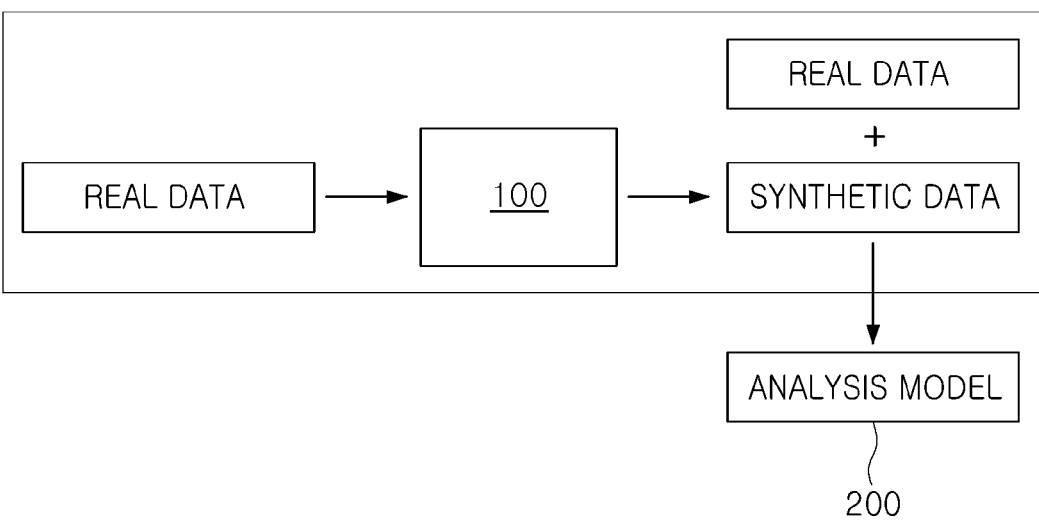
FIG. 4 is a block diagram illustrating a scenario in which an apparatus for data augmentation according to an embodiment is applied.

FIG. 4 is a block diagram illustrating a scenario in which an apparatus for data augmentation according to an embodiment is applied.

The problem caused by class imbalance occurs frequently in manufacturing, financial, and medical data. For example, pieces of data of defective products within manufacturing data, pieces of data of patients having a specific disease within medical data (i.e., minor class) may be less common than pieces of data of normal products within manufacturing data or normal pieces of data within medical data (i.e., major class) within manufacturing data. Since an amount of data, for the pieces of data of defective products or the pieces of data for patients having a specific disease, present in a smaller amount, may be insufficient, it is not sufficient to train a machine learning model for classifying major and minor classes of data. In other words, when real data is directly input into an analysis model 200 of the machine learning model as is, a problem of classification performance, such as algorithm result bias, may occur.

Referring to FIG. 4, according to an embodiment of the present disclosure, pieces of real data, present in a smaller amount, such as the pieces of data of defective products or the pieces of data of patients having a specific disease are input to an apparatus for data augmentation 100 as pieces of minor class original data, and pieces of minor class fake data may be generated as synthetic data using the pieces of minor class original data. Analysis performance of the analysis model 200 of the machine learning model may be improved by inputting the pieces of minor class original data and the pieces of minor class fake data into the analysis model 200 of the machine learning model. In this case, the analysis model 200 may include a classification model.

FIG. 5 is a block diagram illustrating and describing a computing environment including a computing device according to an embodiment.

In the illustrated embodiment, respective components may have functions and capabilities different from those described below, and may include additional components other than those not described below.

The illustrated computing environment 10 includes a computing device 12. In an embodiment, the computing device may be one or more components included in the apparatus for data augmentation 120. The computing device 12 includes at least one processor 14, a computer-readable storage medium 16, and a communication bus 18. The processor 14 may cause the computing device 12 to operate in accordance with the exemplary embodiments described above. For example, the processor 14 may execute one or more programs stored in the computer-readable storage medium 16. The one or more programs may include one or more computer-executable instructions and when the computer-executable instructions are executed by the processor 14, the computer-executable instructions may be configured to cause the computing device 12 to perform operations in accordance with the exemplary embodiment.

The computer-readable storage medium 16 is configured to store computer-executable instructions or program code, program data, and/or other suitable form of information. The program 20 stored in the computer-readable storage medium 16 includes a set of instructions executable by the processor 14. In an embodiment, the computer-readable storage medium 16 may include a memory (volatile memory such as a random access memory, non-volatile memory, or a suitable combination thereof), one or more magnetic disk storage devices, optical disk storage devices, flash memory devices, or any other form of storage medium that can be accessed by the computing device 12 and stored for desired information, or a suitable combination thereof.

The communication bus 18 interconnects various other components of computing device 12, including the processor 14 and computer-readable storage medium 16.

The computing device 12 may also include one or more input/output interfaces 22 and one or more network communication interfaces 26 providing an interface for one or more input/output devices 24. The input/output interface 22 and the network communication interface 26 are connected to the communication bus 18. The input/output device 24 may be connected to other components of computing device 12 via input/output interface 22. The exemplary input/output device 24 may include a pointing device such as a mouse, a trackpad, or the like, a keyboard, a touch input device such as a touch pad, a touchscreen, or the like, input devices such as voice or sound input devices, various types of sensor devices and/or imaging devices, and/or output devices such as display devices, printers, speakers and/or network cards. The exemplary input/output device 24 may be included in the computing device 12 as a component constituting the computing device 12, and may be connected to the computing device 12 as separate device distinct from the computing device 12.

As set forth above, according to the disclosed embodiments, it is possible to overcome a limitation of technique for augmentation for minor classes of table data in which continuous and nominal are mixed.

While the example embodiments have been illustrated and described above, it will be apparent to those skilled in the art that modifications and variations could be made without departing from the scope of the present invention as defined by the appended claims.

What is claimed is:

1. An apparatus for data augmentation, comprising:

one or more processors; and a memory storing one or more programs, wherein the one or more programs are configured to be executed by the one or more processors, wherein the one or more programs include instructions for a mode separating unit, an embedding vector generating unit, an auxiliary classifying unit and a classifying unit;

wherein the mode separating unit is configured to receive input latent vectors and generate one or more minor class candidate data samples, each candidate data sample corresponding to a different feature mode of a minor class, and to select one of the candidate data samples as a minor class fake data sample based on similarity feedback;

the embedding vector generating unit is configured to generate embedding vectors through a metric learning network, the embedding vectors comprising an embedding vector of a major class original data sample, an embedding vector of a minor class original data sample, and an embedding vector of the minor class fake data sample, wherein the metric learning network is trained to minimize a distance between embedding vectors belonging to a same class and to maximize a distance between embedding vectors belonging to different classes;

the auxiliary classifying unit is configured to classify a class of the embedding vectors by receiving the embedding vector of the major class original data sample, the embedding vector of the minor class original data sample, and the embedding vector of the minor class fake data sample from the embedding vector generating unit, and generate a similarity feedback signal indicating whether the minor class fake data sample is misclassified as the major class; and the classifying unit is configured to determine whether input data is authentic by computing a similarity or distance metric between the embedding vector of the minor class original data sample and the embedding vector of the minor class fake data sample, and generate an authenticity feedback signal for updating generation parameters of the mode separating unit, wherein the mode separating unit is trained using both the similarity feedback signal and the authenticity feedback signal to adjust the generation parameters of the minor class fake data sample.

2. The apparatus of claim 1, wherein the mode separating unit comprises a plurality of generating sub-units configured to generate a plurality of minor class candidate data samples different from each other from a latent vector using a generative adversarial network; and a gating network configured to select one of the candidate data samples among the plurality of minor class candidate data samples as the minor class fake data sample.

3. The apparatus of claim 2, wherein, among the plurality of generating sub-units, a generating sub-unit that generates the minor class candidate data sample selected by the gating network is trained so that the minor class candidate data sample is different from the major class original data sample based on a feedback signal from the auxiliary classifying unit.

4. The apparatus of claim 2, wherein, among the plurality of generating sub-units, a generating sub-unit that generates the minor class candidate data sample selected by the gating network is trained so that the minor class candidate data sample is similar to the minor class original data ample based on an authenticity feedback from the classifying unit.

5. The apparatus of claim 2, wherein the gating network is trained to select the minor class candidate data sample having a highest similarity score to the minor class original data sample based on the similarity feedback signal received from the auxiliary classifying unit.

6. The apparatus of claim 2, wherein the plurality of generating sub-units are configured to generate the minor class candidate data sample corresponding to one or more sub-classes of the minor class from the latent vector.

7. The apparatus of claim 1, wherein the embedding vectors are generated so that data included in the same category are close to each other and data included in different categories are distant from each other through metric learning.

8. The apparatus of claim 1, wherein the auxiliary classifying unit is configured to transmit a negative similarity feedback signal to the mode separating unit, when the embedding vector of the minor class candidate data sample is classified into the embedding vector of the major class original data sample or the embedding vector of the minor class fake data sample.

9. The apparatus of claim 1, wherein the classifying unit is configured to transmit a negative authenticity feedback signal to the mode separating unit, when the embedding vector of the minor class fake data sample is determined to be fake based on the similarity or distance metric.

10. A method for data augmentation, the method performed on a computing device including one or more processors and a memory storing one or more programs executed by the one or more processors, the method comprising:

performing a mode separation operation of generating one or more minor class candidate data samples from a latent vector and selecting one of the candidate data samples as a minor class fake data sample based on similarity feedback;

performing an embedding vector generating operation of generating embedding vectors through a metric learning network, the embedding vectors comprising an embedding vector of a major class original data sample, an embedding vector of a minor class original data sample, and an embedding vector of a minor class fake data sample, wherein the metric learning network is trained to minimize a distance between embedding vectors belonging to a same class and to maximize a distance between embedding vectors belonging to different classes;

performing an auxiliary classification operation of classifying a class of the embedding vectors by receiving the embedding vector of the major class original data sample, the embedding vector of the minor class original data sample, and the embedding vector of the minor class fake data sample from the embedding vector generating operation, and generating a similarity feedback signal indicating whether the minor class fake data sample is misclassified as the major class;

performing a classification operation of determining whether input data is authentic by computing a similarity or distance metric between the embedding vector of the minor class original data sample and the embedding vector of the minor class fake data sample and generating an authenticity feedback signal for updating parameters of the mode separation operation, wherein the mode separation operation is trained using both the similarity feedback signal and the authenticity feedback signal to adjust generation parameters for the minor class fake data sample.

11. The method of claim 10, wherein, in the mode separation operation, a plurality of minor class candidate data samples different from each other are generated from the latent vector using a plurality of generative adversarial networks; and one of the plurality of the candidate data samples is selected as the minor class fake data sample.

12. The method of claim 11, wherein the generative adversarial neural network generating the selected one of the candidate data samples is trained so that the minor class candidate data sample is different from the major class original data sample based on a feedback signal received from the auxiliary classification operation.

13. The method of claim 11, wherein the generative adversarial neural network generating the selected one of the candidate data samples is trained so that the minor class candidate data sample is similar to the minor class original data sample based on an authenticity feedback received from the classification operation.

14. The method of claim 11, wherein, in the mode separation operation, a gating network is trained to select the minor class candidate data sample having a highest similarity score to the minor class original data sample based on the similarity feedback signal received from the auxiliary classification operation.

15. The method of claim 11, wherein the plurality of generative adversarial neural networks generate the minor class candidate data sample corresponding to one or more sub-classes of the minor class from the latent vector.

16. The method of claim 10, wherein the embedding vectors are generated so that data included in the same category close to each other and data included in different categories are distant from each other through metric learning.

17. The method of claim 10, wherein, in the auxiliary classification operation, when the embedding vector of the minor class candidate data sample is classified into the embedding vector of the major class original data sample or the embedding vector of the minor class fake data sample, a negative similarity feedback signal is transmitted to the mode separation operation.

18. The method of claim 10, wherein, in the classification operation, when the embedding vector of the minor class candidate data sample is determined to be fake, a negative authenticity feedback signal is transmitted to the mode separation operation.

19. An apparatus for data augmentation, comprising:

one or more processors; and a memory storing one or more programs, wherein the one or more programs are configured to be executed by the one or more processors, wherein the one or more programs include instructions for:

a mode separating unit configured to generate one or more minor class candidate data samples from a latent vector and select one of the candidate data samples as a minor class fake data sample based on similarity feedback;

an embedding vector generating unit configured to generate embedding vectors through a metric learning network, the embedding vectors comprising an embedding vector of a major class original data sample, an embedding vector of a minor class original data sample, and an embedding vector of a minor class fake data sample, wherein the metric learning network is trained to minimize a distance between embedding vectors belonging to a same class and to maximize a distance between embedding vectors belonging to different classes;

an auxiliary classifying unit configured to classify a class of an embedding vector by receiving the embedding vector of the major class original data sample, the embedding vector of the minor class original data sample, and the embedding vector of the minor class fake data sample from the embedding vector generating unit, and generate a similarity feedback signal indicating whether the minor class fake data sample is misclassified as the major class; and a classifying unit configured to determine whether input data is authentic by computing a similarity or distance metric between the embedding vector of the minor class original data sample and the embedding vector of the minor class fake data sample, and generate an authenticity feedback signal for updating generation parameters of the mode separating unit, wherein the mode separating unit is trained using both the similarity feedback signal and the authenticity feedback signal to adjust the generation parameters of the minor class fake data sample.

* * * * *